United States Patent [19]

Engelskirchen et al.

[11] Patent Number: 5,501,814
[45] Date of Patent: Mar. 26, 1996

[54] DETERGENTS AND CLEANING PREPARATIONS CONTAINING SELECTED BUILDER SYSTEMS

[75] Inventors: Konrad Engelskirchen, Meerbusch; Herbert Fischer; Beatrix Kottwitz, both of Duesseldorf; Horst Upadek, Ratingen; Christian Nitsch, Duesseldorf, all of Germany

[73] Assignee: Henkel Kommanditgesellschaft auf Aktien, Duesseldorf, Germany

[21] Appl. No.: 211,884

[22] PCT Filed: Oct. 14, 1992

[86] PCT No.: PCT/EP92/02368

§ 371 Date: Apr. 22, 1994

§ 102(e) Date: Apr. 22, 1994

[87] PCT Pub. No.: WO93/08251

PCT Pub. Date: Apr. 29, 1993

[30] Foreign Application Priority Data

Oct. 23, 1991 [DE] Germany .......................... 41 34 914.8

[51] Int. Cl.⁶ .................................. C11D 9/20; C11D 2/26
[52] U.S. Cl. .......................... 252/174.17; 252/174.18; 252/131; 252/174.14; 252/145; 252/159; 252/160
[58] Field of Search ............ 252/174.17, 174.18, 252/128, 131, 174.14, 145, 159, 160

[56] References Cited

U.S. PATENT DOCUMENTS

| | | | |
|---|---|---|---|
| 2,472,590 | 6/1949 | Kenyon et al. | 260/209 |
| 2,894,945 | 7/1959 | Hofreiter et al. | 260/233.3 R |
| 3,665,000 | 5/1972 | Hills et al. | 260/233.3 R |
| 3,740,339 | 6/1973 | MacDonald | 252/135 |
| 3,790,561 | 2/1974 | MacDonald | 260/212 |
| 4,755,318 | 7/1988 | Davies et al. | 252/109 |

FOREIGN PATENT DOCUMENTS

| | | | |
|---|---|---|---|
| 2028284 | 10/1989 | Canada | C11D 3/06 |
| 0010247 | 10/1979 | European Pat. Off. | C11D 3/12 |
| 0164514 | 12/1985 | European Pat. Off. | C01B 33/32 |
| 0240356 | 10/1987 | European Pat. Off. | C11D 3/12 |
| 0337219 | 10/1989 | European Pat. Off. | C11D 3/08 |
| 0337217 | 10/1989 | European Pat. Off. | C11D 3/39 |
| 0405122 | 1/1991 | European Pat. Off. | C11D 3/12 |
| 0425369 | 5/1991 | European Pat. Off. | C11D 3/22 |
| 0455522 | 11/1991 | European Pat. Off. | C11D 3/22 |
| 0542496 | 11/1992 | European Pat. Off. | C08B 31/18 |
| 0872917 | 6/1942 | France | C11D 3/22 |
| 2659979 | 9/1991 | France | C11D 3/22 |
| 2412837 | 10/1974 | Germany | C11D 3/12 |
| 2556009 | 6/1977 | Germany | C11D 1/22 |
| 4106880 | 9/1992 | Germany | C11D 3/14 |
| 0069883 | 4/1952 | Netherlands . | |
| 0078087 | 3/1955 | Netherlands | C11D 3/22 |
| 7002500 | 2/1970 | Netherlands . | |
| 9102047 | 2/1991 | WIPO | C11D 17/06 |

OTHER PUBLICATIONS

"Cellulose Chemistry and its Applications" (1983), John Wiley & Sons, Chichester, GB, cf. in particular T. P. Nevell, Oxidation of Cellulose Chapter 10) and the extensive literature cited therein, loc. cit., pp. 262 to 265 month not available.

F. J. Dany et al. "Kristallines Schichtsilikat—ein neuer Builder (Crystalline Layer Silicate—A New Builder)", Seifen–Öle–Fette–Wachse 20/1990, 805 to 808 Dec. 1990.

K.-H. Bergk et al. "Herstellung und Verwendung von Magadiit als Phosphatsubstitut in Waschmittelin (Production and Use of Magadiite as a Phosphate Substitute in Detergents)", Seifen–Öle–Fette–Wachse 15/1987, 555 to 561 Sep. 1987.

Houben–Weyl "Methoden der Organischen Chemie", Thieme–Verlag, Stuttgart (1987), vol. E 20, Makromolekulare Stoffe, Chapter entitled Polysaccharid–Derivative Polysaccharide Derivatives) edited by Dr. K. Engelskirchen, loc. cit., pp. 2042 et aeq., more particularly pp. 2124 et seq. (Oxidation products of Cellulose) and pp. 2166 et seq. (Oxidized Starches) month not available.

Primary Examiner—Paul Lieberman
Assistant Examiner—Patricia L. Hailey
Attorney, Agent, or Firm—Ernest G. Szoke; Wayne C. Jaeschke; Real J. Grandmaison

[57] ABSTRACT

A process and surfactant-containing composition for reducing incrustation on washed laundry. The composition contains finely-divided, water-insoluble builder components and an at least partly water-soluble co-builder which is the oxidation product of polyglucosans wherein, on average, at least 15 mole percent thereof consists of oxidized anhydroglucose units corresponding to formula I

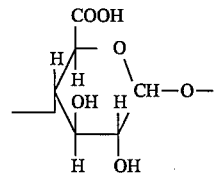

and which have an average molecular weight of up to 15,000.

21 Claims, No Drawings

DETERGENTS AND CLEANING PREPARATIONS CONTAINING SELECTED BUILDER SYSTEMS

BACKGROUND OF THE INVENTION

1. Field of the Invention

This invention relates to a new proposal for the production of builder systems for use in surfactant-containing detergent and/or cleaning mixtures which may be made up as preferably phosphate-free mixtures of the type in question. More particularly, the invention seeks to achieve a further improvement in the so-called co-builder components in builder systems which contain fine-particle components insoluble under in-use conditions, more particularly corresponding mineral components, as their main builder in conjunction with at least one partly soluble co-builder, the co-builder normally being present in comparatively small quantities.

Fine-particle zeolite, more particularly zeolite NaA, is used as a phosphate substitute in modern detergents and cleaning preparations, being capable of binding the salts responsible for water hardness, above all calcium and/or magnesium ions, in the washing water and soil. However, so-called co-builders or co-builder systems also have to be used to a considerable extent, particularly in laundry detergents, above all to counter-act unwanted incrustation. Polymeric polycarboxylates, more particularly copolymers based on acrylic acid and maleic acid, in conjunction with soda are widely used for this purpose together with zeolite NaA. Complexing agents, such as salts of nitrilotriacetic acid (NTA) and phosphonic acid derivatives (HEDP), are additionally used. Co-builder combinations such as these in detergents and cleaning preparations of the type in question counter-act the precipitation of poorly soluble calcium salts and the resulting incrustation and discoloration of fabrics. Another desirable result is inter alia the greater whiteness of fabrics which can be achieved with builder combinations such as these.

2. Discussion of Related Art

In recent years, numerous proposals have been put forward with a view to at least partly replacing builder systems of the type described above by other components. These proposals have been prompted inter alia by the possibility of unwanted secondary effects after the used washing and cleaning solutions have been drained off into the wastewater system.

For example, crystalline layer-form sodium silicates have been described as substitutes or rather as partial substitutes for phosphates and zeolites. Thus, European patent application EP 164 514 describes a phosphate-free builder combination which mainly contains crystalline layer silicates with the selected structural formula $NaMSi_xO_{2+1} \cdot yH_2O$, where M is sodium or hydrogen, x is a number of 1.9 to 4 and y is a number of 0 to 20, x preferably having a value of 2, 3 or 4. These layer silicates may be used as water softeners both separately and in detergents and cleaning preparations together with other builders or co-builders, such as phosphates, zeolite, other silicates, phosphonates and polycarboxylates. Reference is also made in this regard to the articles by F. J. Dany et al. "Kristallines Schichtsilikat—ein neuer Builder (Crystalline Layer Silicate-A New Builder)", Seifen-öle-Fette-Wachse 20/1990, 805 to 808 and by K.-H. Bergk et al. "Herstellung und Verwendung von Magadiit als Phosphatsubstitut in Waschmitteln (Production and Use of Magadiite as a Phosphate Substitute in Detergents)", Seifen-öle-Fette-Wachse 15/1987, 555 to 561 and the literature cited therein.

DE-OS 25 56 009 describes laundry detergents containing 12 to 25% by weight of zeolite, more particularly zeolite 4A, 5 to 20% by weight of a sodium silicate and a peroxy bleaching agent. According to this literature reference, unwanted deposits of the water-insoluble zeolite particles on the washing are said to be prevented by the use of 0.3 to 3% by weight of a polymer from the group consisting of carboxymethyl cellulose, lower alkyl cellulose, hydroxy lower alkyl cellulose, polyvinyl alcohol, polyvinyl acetate and/or polyvinyl pyrrolidone.

European patent application EP 010 247 describes laundry detergents containing surfactants in typical quantities, zeolite, alkali metal silicate and optionally a peroxy bleaching agent. The addition of water-soluble organic complexing agents from the group of substituted alkane diphosphonic acids and alkane triphosphonic acids, which are present in the form of their alkali metal and/or alkaline earth metal salts, is said to give a detergent which not only has a good primary washing effect, it also reduces fiber incrustation. Increased bleaching stability is achieved at the same time. The detergent contains 20 to 65% by weight of the fine-particle zeolite described in DE-PS 24 12 837 and 1 to 7% by weight of solid, powder-form sodium silicate with the molar composition $Na_2O:SiO_2=1:2$ to 1:2.2. Water-soluble organic complexing builders and other detergents may also be used.

In addition, corresponding combinations of mineral fine-particle main builder components insoluble under in-use conditions in combination with soluble co-builders, more particularly on the basis of polycarboxylates and derivatives thereof, are described, for example, in European patent applications EP 240 356, EP 337 217, EP 337 219 and EP 405 122.

Applicants' earlier German patent application P 41 06 880 relates to detergents, more particularly laundry detergents, containing surfactants, zeolite and alkali metal silicate and optionally a peroxy bleaching agent. By selecting a certain fine-particle hydrated zeolite with an average particle size of 1 to 5 µm in combination with limited quantities of a solid selected alkali metal silicate, it is said to be possible to keep the detergent free from water-soluble organic complexing agents from the group of substituted phosphonates, free from polymeric polycarboxylates and free from alkali metal carbonates. Despite this, satisfactory washing results are obtained, even in regard to secondary effects, i.e. in regard to the particular percentage ash and incrustation contents.

The problem addressed by the teaching of the present invention was to resort to detergent and cleaning formulations of the type mentioned at the beginning in which combinations of fine-particle, insoluble, mineral main builder components with incrustation-preventing co-builders are used to replace the previously typical phosphate-based builder system. More particularly, the invention sought to provide co-builders which, on the one hand, would be highly effective in use, but which on the other hand could be regarded as comparatively unproblematical mixture components in the wastewater on completion of the washing and cleaning process. The invention sought to solve this problem above all with co-builder components based on derivatized natural substances which would be accessible to natural degradation processes and which would not initiate any unwanted secondary effects, for example the remobilization of heavy metals.

DESCRIPTION OF THE INVENTION

The solution provided by the invention is based on the surprising observation that selected polyglucosan derivatives, more particularly corresponding starch-based derivatives, can be highly effective co-builder components as defined above and, at the same time, can be inexpensively obtained by a simple process.

Accordingly, the present invention relates to surfactant-containing detergents and/or cleaning preparations, more particularly laundry detergents, containing fine-particle builder components insoluble under in-use conditions together with a small quantity of at least partly soluble co-builders, if desired in conjunction with bleaching agents and other typical constituents of detergents and cleaning preparations. The invention is characterized in that the detergents and/or cleaning preparations contain as co-builders selected oxidation products of polyglucosans of which, on a statistical average, at least 15 mole-% consist of oxidized anhydroglucose units corresponding to formula I:

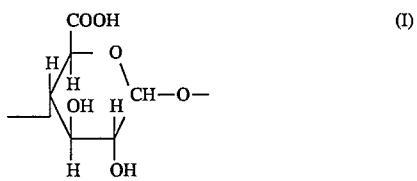

i.e. glucuronic acid units linked by 1,4-glycoside bonds, and which have average molecular weights of at most about 15,000 and/or soluble salts thereof. Preferred salts are the alkali metal salts, more particularly the corresponding sodium salts.

More particularly, the present invention relates to the use of the above co-builders based on oxidation products of polyglucosans for reducing incrustation in the washing of fabrics with phosphate-free laundry detergents based on fine-particle insoluble and, in particular, mineral main builder components. The most important fine-particle insoluble main builders according to the invention for combination with the above-defined co-builders based on polyglucosans at least partly derivatized in the 6-position is the sodium zeolite NaA described, for example, in German patent DE 24 12 837, for example in connection with laundry detergents.

The teaching according to the invention is based on the discovery that polyglucosans can be converted into highly effective co-builder components as defined above by selective, but comparatively simple derivatization. Corresponding starch-based compounds play a particularly important role in this regard. However, the invention is by no means limited to such compounds. Other polymer compounds based on anhydroglucose units, more particularly cellulose, can also be converted into effective co-builders in the context of the teaching according to the invention. The particular advantage of using corresponding starch-based derivatives, as is preferably the case in accordance with the invention, lies inter alia in the fact that, starting out from starch, the two key conversion stages, which are crucial to the formation of a co-builder according to the invention, can be converted into a single process step in a very simple reaction: on the one hand the sufficient reduction in the molecular weight of the starch molecule of natural origin and on the other hand the largely selective oxidation of the primary alcohol group of the anhydroglucose units to the carboxy group.

Extensive knowledge exists on the production of polysaccharide derivatives by oxidative treatment, for example of cellulose, starch and dextrins, cf. for example Houben-Weyl "Methoden der Organischen Chemie", Thieme-Verlag, Stuttgart (1987), Vol. E 20, Makromolekulate Stoffe, chapter entitled "Polysaccharid-Derivative (Polysaccharide Derivatives)", edited by Dr. K. Engelskitchen, loc. cit., pages 2042 et seq., more particularly pages 2124 et seq. (Oxidation Products of Cellulose) and pages 2166 et seq. (Oxidized Starches) and also the book entitled, "Cellulose Chemistry and its Applications", (1983), John Wiley & Sons, Chichester, GB, cf. in particular T. P. Nevell, "Oxidation of Cellulose", (Chapter 10) and the extensive literature cited therein, loc. cit., Accordingly, the situation may generally be summarized as follows: several oxidizing agents are commonly used for the oxidation of polyglucosans, including for example (atmospheric) oxygen, hydrogen peroxide, sodium hypochlorite or bromite, periodic acid and periodates, lead(IV) acetate, nitrogen dioxide and cerium(IV) salts. These oxidizing agents react very differently with the anhydroglucose units, cf. for example the formula schemes in Houben-Weyl, loc. cit., page 2124. It is known that, where cellulose is exposed to the action of nitrogen dioxide, the oxidation of the primary alcohol group to the carboxy group is by far the predominant reaction. The oxidizing agent may be used in the form of a gas or in the form of a solution in an inert organic solvent, cf. also Houben-Weyl, loc. cit., page 2125 and the primary literature cited in this connection. Starting out from starch also, the primary alcohol group of the anhydroglucose unit can be oxidized largely selectively to the carboxy group along corresponding lines. The teaching according to the invention is based on this knowledge of the prior art.

For example, monocarboxyl starches with a freely selectable degree of conversion of the primary alcohol groups can be produced by selective oxidation of the primary alcohol groups with nitrogen dioxide at low temperatures, even in the absence of auxiliaries, for example solvents or catalysts. At the same time, the units of the starch molecule can also be reacted in a substantially quantitative and largely selective reaction.

However, for the purpose of using such derivatized natural substances in accordance with the invention as co-builders in the builder system mentioned at the beginning, a quantitative reaction such as this is not necessary and, in one important embodiment, is not even desirable. Instead, the interplay of the following two parameters is the crucial factor: adequate conversion of the primary alcohol groups to carboxy groups and, on the other hand, regulation of the average molecular weight of the natural polyglucosan molecule to sufficiently degraded fragments. The first of these two parameters would appear to have functional significance for the interaction with the hardness salts for example, while the sufficiently limited average molecular weight of the modified polyglucosan units may be important inter alia for the adequate solubility of the co-builder under in-use conditions.

These two parameters are discussed in more detail in the following:

The preferred lower limit to the content of glucuronic acid units corresponding to formula I in the polyglucosan derivatives is at around 25 mole-% and preferably at least about 35 mole-% to 40 mole-%. According to the invention, it can be important that no significant quantities of other secondary oxidation products should be present in the selectively oxidized polyglucosan molecule, quantities below 10 mole-% and, in particular, below 5 mole-% being of particular significance in this regard. The substantially quantitative conversion of the primary alcohol groups into carboxy groups is possible so that the upper limit to the corresponding content of glucuronic acid units is at around 95 mole-% to 98 mole-%. Corresponding oxidation products characterized by contents of selectively oxidized groups in the range from about 35 mole-% to 80 mole-% can be particularly suitable for practical application, the content of these oxidized anhydroglucose units in one important embodiment being in the range from about 40 mole-% to 60 mole-%.

The average molecular weight of the polyglucosan derivatives ultimately present is preferably in the range from about 1,000 to 10,000 and more preferably in the range from about 1,500 to 5,000. In the derivatization of starches in accordance with the invention, it has been found that, in the oxidative treatment of dry starch, which normally contains limited quantities of water, with $NO_2$ and the optional conversion of the oxidation products into water-soluble salts, the substantially selective oxidation in the primary alcohol groups is accompanied by reduction of the molecular weight of the starch molecule to such an extent that the derivatized polyglucosans formed are particularly suitable as co-builders. Their average molecular weight is typically in the range from about 1,500 to 3,000 or 4,000. Co-builders such as these are preferably produced by oxidation and hydrolysis of fine-particle native starch in a fluidized bed in a gas phase containing $NO_2/N_2O_4$.

The use of oxidized polysaccharide compounds for boosting the performance of detergents and/or cleaning products has been known and widely investigated for decades, cf. for example Dutch patents NL 69 883 and NL 78 087. The replacement of phosphate-based builder systems, more particularly trisodium tripolyphosphate by 6-carboxycellulose, is described in U.S. Pat. Nos. 3,740,339 and in 3,790,561. Dutch patent application NL 70/02 500 also seeks to use oxidized polysaccharide derivatives as a builder system for boosting detergent performance, particularly in laundry detergents. However, the document in question is not concerned with derivatives selectively oxidized at the $C_6$ atom, but instead with the substantial cleavage of the anhydroglucose units between $C_2$ and $C_3$ and seeks to make use of the oxidation products formed.

Finally, European patent application EP 425 369 which was only recently published relates to surfactant-containing mixtures for laundry detergents containing a builder system of the following three components: a conventional phosphate compound, more particularly sodium tripolyphosphate, zeolite and oxidation products of cellulose, starch or glucose syrup. A reproducible description of the production of the oxidized oligosaccharide compounds described therein is not given. Accordingly, it is not clear which structure is assigned to the oxidates. The only specific disclosure relates to an oxidized glucose syrup which is said to have been produced by catalytic oxidation, cf. loc. cit., page 5, 31/32. In addition, stabilization of the oligosaccharide oxidates initially formed by catalytic hydrogenation is said to be desirable, see loc. cit., page 3, 36/50. Taking specialist knowledge into account, the oligosaccharide oxidates in question can only be oligosaccharide oxidates which, in terms of constitution, cannot be compared with the co-builder components defined in accordance with the invention. Irrespective of this, the teaching of the document in question stipulates the use of considerable quantities of conventional phosphates whereas the teaching according to the invention, as explained at the beginning, is intended in particular to provide builder combinations for phosphate-free detergents which contain the proven fine-particle mineral constituents, such as zeolite NaA, as principal components, but in which there is no need at all for the constituents hitherto typically used as co-builder components.

The teaching according to the invention of being able to replace the above-defined polyglucosans selectively derivatized at the primary alcohol group as sole co-builder with no need for organic complexing agents from the group of synthetic polymeric carboxylates, substituted phosphonates and/or NTA, so that completely phosphate-free detergents and cleaning products can be obtained, does not derive from the document cited in the preceding paragraph.

The co-builders in the context of the definition according to the invention are typically used in the detergents and cleaning preparations in quantities of from about 0.5% by weight to 15% by weight and, more particularly, in quantities of from about 0.5% by weight to 10% by weight, based on the total weight of the detergent or cleaning preparation. Co-builder contents of 2% by weight to 7% by weight can often be useful for laundry detergents. This figure derives from the quantities in which the zeolite NaA in particular is typically used as the principal builder and which will be discussed in more detail in the following. In quantitative terms, the co-builder is a minor component compared with the main builder component. In quantitative terms, the main builder component usually makes up at least twice and preferably at least about 3 to 4 times, based on the quantity of co-builder according to the invention.

In other respects, the composition of the detergents and/or cleaning preparations may be selected virtually as required within the limits of known formulations. Accordingly, the following observations are merely to be interpreted as exemplary and illustrative.

Detergents and cleaning products, more particularly laundry detergents, typically contain as their principal components surfactants, the builder system according to the invention, alkalizing agents, such as soluble alkali metal silicates, optionally a peroxy bleaching agent and other typical ingredients of detergents and cleaning preparations, such as foam inhibitors, optical brighteners and/or redeposition inhibitors, enzymes, fabric softeners, dyes and fragrances and optionally neutral salts, solvents and water.

The total surfactant content of the detergents is generally between 5 and 40% by weight and may preferably be between 5 and 30% by weight and, more preferably, between 8 and 25% by weight. Typical surfactants for detergents and cleaning products belong to the groups of anionic, nonionic and/or zwitterionic surfactants. Particularly suitable anionic surfactants are sulfonates and sulfates and also soaps of preferably natural fatty acids or fatty acid mixtures. For example, $C_{9-13}$ alkylbenzene sulfonates, olefin sulfonates, esters of α-sulfofatty acids or α-sulfofatty acid disalts are used as surfacrants of the sulfonate type. Suitable surfactants of the sulfate type are the sulfuric acid monoesters of primary saturated or unsaturated alcohols of natural or synthetic origin, i.e. of $C_{12-18}$ fatty alcohols or $C_{10-20}$ oxoalcohols, and those of secondary alcohols having the same chain length. Sulfuric acid monoesters of alcohols reacted with 1 to 6 moles of ethylene oxide (EO) are also suitable. The alkylbenzene sulfonates mentioned are preferably used, the fatty alcohol sulfates mentioned being. particularly preferred. Suitable nonionic surfactants are, above all, adducts of preferably 2 to 20 moles of EO with 1 mole of an aliphatic compound essentially containing 10 to 20 carbon atoms from the group of alcohols, carboxylic acids, fatty amines, carboxylic acid amides and alkanesulfonamides. In addition to water-soluble nonionic surfactants, however, water-insoluble or substantially water-insoluble polyglycol ethers containing 2 to 7 ethylene glycol ether units in the molecule are also important, particularly when they are used together with water-soluble nonionic or anionic surfactants. Alkyl polyglycosides corresponding to the general formula R—O—(G)$_x$, in which R is a primary linear or 2-methyl-branched aliphatic radical containing 8 to 22 and preferably 12 to 18 carbon atoms, G is a glycose unit containing 5 or 6 carbon atoms and the degree of oligomerization x is between 1 and 10, may also be used as nonionic surfactants.

The quantity in which the fine-particle, preferably mineral main builder component, more particularly zeolites of detergent quality and/or crystalline alkali metal silicates of the type mentioned above, is used is typically in the range from about 10 to 65% by weight and preferably in the range from about 20 to 50% by weight, based on the detergent or cleaning preparation.

Fine-particle hydrated zeolite NaA generally has a water content of 17 to 25% by weight. However, the quantity data for zeolite apply to the anhydrous active substance. In addition to zeolites of the A type, mixtures of zeolite NaA and NaX may also be used, the percentage content of zeolite NaX in mixtures such as these best being below 30%.

The alkalizing agents typically used include alkali metal silicates. Preferred alkali metal silicates are the sodium silicates, more particularly the amorphous sodium silicates, with a molar ratio of $Na_2O$ to $SiO_2$ of 1:2 to 1:3. Amorphous alkali metal silicates such as these are commercially available, for example, under the name of Portil®.

The alkali metal silicate content of the detergents and cleaning preparations may be, for example, from about 2 to 10% by weight, based on anhydrous substance. Amorphous sodium silicate contents of from about 3 to 8% by weight, based on anhydrous substance, may be preferred. The ratio by weight of zeolite to amorphous silicate, based on anhydrous substance, may be for example from about 4:1 to 10:1.

Preferred detergents and cleaning preparations, more particularly laundry detergents, contain peroxy bleaching agents and, in particular, peroxy bleaching agents in combination with bleach activators. Among the compounds which yield $H_2O_2$ in water which are used as bleaching agents, sodium perborate tetrahydrate ($NaBO_2.H_2O_2.3H_2$) and sodium perborate monohydrate ($NaBO_2.H_2O_2$) are of particular significance. Other useful bleaching agents are, for example, peroxycarbonate ($Na_2CO_3.1.5\ H_2O_2$) or peracidic salts of organic acids, such as perbenzoates or salts of diperdodecanedioic acid. Suitable bleach activators for these peroxy bleaching agents are, for example, the N-acyl and O-acyl compounds which form organic peracids with $H_2O_2$, preferably N,N'-tetraacylated diamines, such as N,N,N'N'-tetraacetyl ethylenediamine. The peroxy bleaching agent content of the detergents is preferably from about 10 to 30% by weight, more particularly in combination with about 1 to 5% by weight of a bleach activator.

In the preferred embodiment, the detergents and cleaning preparations according to the invention do not contain any water-soluble organic complexing agents from the group of phosphonates nor any co-builders based on synthetic polymeric polycarboxylates, for example polyacrylates, polymethacrylates, polymaleates or copolymers of acrylic acid with maleic acid or maleic anhydride. Other complexing agents, such as the salts of nitrilotriacetic acid, are also absent from the preferred detergents according to the invention. If desired, there is even no need at all to add soda.

The other ingredients of detergents and cleaning preparations mentioned above, which typically are only present in small quantities, may make up in particular as much as 40% by weight and preferably from 5 to 30% by weight. This class of minor components includes, for example, foam inhibitors, redeposition inhibitors, optical brighteners, dyes, fragrances, dye transfer inhibitors and enzymes, more particularly of the protease, lipase and/or amylase types. The enzymes may be adsorbed onto supports and/or may be encapsulated in shell-forming substances. Suitable non-surface-active and preferred foam inhibitors are organopolysiloxanes and mixtures thereof with microfine, optionally silanized silica. Mixtures of different foam inhibitors, for example mixtures of silicones and paraffins or waxes, are also suitable. The foam inhibitors are preferably fixed to a granular water-soluble or water-dispersible support.

The detergents and/or cleaning products according to the invention are preferably in the form of pourable, powder-form or granular preparations which may be produced in known manner, for example by mixing, granulation and/or spray drying and, optionally, subsequent compaction. The disclosures of the relevant prior-art literature are applicable in this regard. In part at least, the detergents and/or cleaning preparations or individual components or sub-combinations of several elements may be conventionally obtained in dry form by spray drying and then mixed with, in particular, temperature-sensitive components.

In one particular embodiment, the invention relates to detergents having apparent densities of at least 650 g/l, preferably 700 g/l to 1,200 g/l and more preferably 800 g/l to 1,000 g/l. The detergents in question may be produced by granulation, for example by wet granulation and subsequent drying, more particularly fluidized bed drying. Compressed washing-active preparations, produced for example by compacting or pelleting, may of course also contain the co-builder according to the invention.

A product produced by the process according to International patent application WO 91/2047 is preferred in this regard. The product in question is a detergent or detergent precursor which is produced by strand-form extrusion of a homogeneous compound, optionally containing an added plasticizing agent, through perforated dies, preferably with a perforation diameter of 0.5 mm to 5 mm, subsequent size-reduction of the extrudate by means of a cutting unit and aftertreatment in a spheronizer and which may even used in admixture with other detergent ingredients.

One preferred embodiment of a solid, granular universal detergent according to the invention with an apparent density of 700 g/l to 1,200 g/l and, more particularly, 800 g/l to 1,000 g/l contains 15% by weight to 25% by weight of anionic surfactant, 1% by weight to 15% by weight of nonionic surfactant, 15% by weight to 40% by weight of alkali metal alumosilicate, more particularly zeolite NaA, 2% by weight to 15% by weight of co-builder according to the invention, 10% by weight to 30% by weight of bleaching agent, 2% by weight to 10% by weight of bleach activator, up to 10% by weight and preferably 1% by weight to 5% by weight of alkali metal silicate, up to 15% by weight and preferably 3% by weight to 12% by weight of alkali metal carbonate, up to 4% by weight and preferably 0.5% by weight to 3% by weight of alkali metal sulfate, 0.1% by weight to 10% by weight of at least one substance from the group of foam inhibitors, enzymes, redeposition inhibitors, optical brighteners, dyes and fillers and 1 to 20% by weight of water.

Another preferred embodiment of the detergents and/or cleaning preparations according to the invention is a detergent for delicate and colored fabrics with an apparent density of 700 g/l to 1,200 g/l and, more particularly, 800 g/l to 1,000 g/l which is characterized by the following composition:

5% by weight to 15% by weight and, more particularly, 6% by weight to 13% by weight of anionic surfactant, more particularly from the group of fatty alcohol sulfates, 10% by weight to 22% by weight and, more particularly, 12% by weight to 20% by weight of nonionic surfactant, more particularly from the group of alkyl polyethylene glycol ethers, 20% by weight to 45% by weight and, more particularly, 25% by weight to 30% by weight of alkali metal alumosilicate, more particularly zeolite NaA, 5% by weight to 20% by weight of co-builder according to the invention, 2% by weight to 10% by weight and, more particularly, 4% by weight to 8% by weight of alkali metal carbonate, up to 10% by weight and, more particularly, 1% by weight to 5% by weight of alkali metal silicate, up to 4% by weight and, more particularly, 0.5% by weight to 3% by weight of alkali metal sulfate, 0.1 to 2.5% by weight of foam inhibitor, 0.5% by weight to 5% by weight of dye transfer inhibitor, more particularly polyvinyl pyrrolidone, 0.1% by weight to 3% by weight of one or more substances from the group of fabric softeners, redeposition inhibitors, dyes and fragrances and 5% by weight to 20% by weight of water.

EXAMPLES

The production of the co-builder component according to the invention based on oxidation products of polyglucosans by selective oxidation and partial depolymerization of potato starch is described in the first three of the following Examples (Examples 1 to 3). The products produced in these Examples differ in the degree of conversion of the primary alcohol groups in the anhydroglucose units into carboxy groups. The theoretical acid value (AV) for a 100% conversion corresponds to a figure of 319. As can be seen from the acid value figures, Examples 1 to 3 were carried out with decreasing values of the particular degree of conversion in the oxidation reaction.

Example 1

200 g of potato starch with a moisture content of approximately 8% by weight were exposed to an $NO_2$ atmosphere for 168 hours at room temperature (approx. 20° C.) in an exsiccator over fuming nitric acid.

The oxidized starch was then washed with water, freed from water with acetone and dried at 60° C. in a vacuum drying cabinet.

158 g of a white powder-form product with an acid value of 317 and an average molecular weight (as determined in an aqueous solution of the sodium salt by GPC; comparison standard: polyethylene glycols) of approximately 2,500 were obtained.

Example 2

An in Example 1, 100 g of moist potato starch were exposed to an $NO_2$ atmosphere for 48 hours. 77 g of oxidized starch with an AV of 210 were obtained after working up.

Example 3

As in Example 1, 100 g of moist potato starch were exposed to an $NO_2$ atmosphere for 24 hours. 81 g of oxidized starch with an AV of 95 were obtained after working up.

Example 4

The secondary washing result (determined as % by weight total incrustation and % by weight ash) was determined in a series of comparison tests in which the following three detergent formulations were compared with one another:

1) Basic formulation of a universal laundry detergent containing zeolite NaA as builder component, but no additional co-builder component.

2) Basic formulation of the universal laundry detergent according to 1.), but with addition of typical quantities of a co-builder system of synthetic polycarboxylate (commercial product "Sokalan CP5" (3.8% by weight), HEDP (0.4% by weight) and soda (12.5% by weight), percentages by weight based on the detergent formulation as a whole.

3) Universal laundry detergent corresponding to basic formulation 1.)+5.0% by weight of the oligomeric oxidation product of Example 1.

Bleached cotton cloth and control fabrics from the Wäschereiforschungsanstalt Krefeld were used as fabrics for the ash and incrustation measurements, the washing tests being carried out under the following conditions:

Temperature, liquor: 90° C., 120 ml

Detergent dosage: 7.8 g/l

Water hardness: 30° dH

Load: liquor ratio 1:12

The starting values for ash and total incrustation as determined on the fresh unwashed test fabrics amounted to 0.22 for bleached cotton cloth.

We claim:

1. A surfactant-containing detergent composition comprising finely-divided, water-insoluble builder components and from 0.5% to 15% by weight, based on the weight of said composition, of an at least partly water-soluble co-builder, said co-builder comprising the oxidation products of polyglucosans wherein, on average, at least 15 mole percent thereof consists of oxidized anhydroglucose units corresponding to formula I

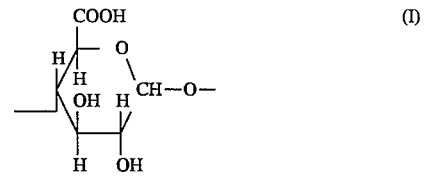

and which have an average molecular weight of up to 15,000.

2. A composition as in claim 1 wherein said co-builder contains at least 25 mole percent of said oxidized anhydroglucose units.

3. A composition as in claim 1 wherein the carboxyl groups of said co-builder are present at least partly as alkali metal salts.

4. A composition as in claim 1 wherein said co-builder is derived from the group consisting of cellulose- and starch-based polyglucosans and which contains up to 95 mole percent of oxidized anhydroglucose units having an average molecular weight from 1,000 to 10,000.

5. A composition as in claim 1 wherein said co-builder has been produced by selective oxidation of starch using NO₂ as the oxidizing agent.

6. A composition as in claim 1 wherein said co-builder comprises selectively oxidized starch derivatives having average molecular weights from 1,500 to 3,000 produced by oxidation and hydrolysis of moisture-containing, finely-divided native starch in a fluidized bed in the presence of a gas phase consisting of NO₂ or N₂O₄.

7. A composition as in claim 1 substantially free from water-soluble organic complexing agents selected from the group consisting of polymeric carboxylates, substituted phosphonates, and salts of nitrilotriacetic acid, and phosphates.

8. A composition as in claim 1 wherein said water-insoluble builder components are selected from the group consisting of zeolite compounds, crystalline layer silicates, and hydrotalcites.

9. A composition as in claim 8 wherein said zeolite compounds and said co-builder are present in a weight ratio of at least 3:1.

10. A composition as in claim 1 having an apparent density of 700 g/l. to 1,200 g./l., and containing 15% to 25% by weight of anionic surfactant, 1% to 15% by weight of nonionic surfactant, 15% to 40% by weight of alkali metal aluminosilicate, 2% to 15% by weight of said co-builder, 10% to 30% by weight of bleaching agent, 2% to 10% by weight of bleach activator, up to 10% by weight of alkali metal silicate, up to 15% by weight of alkali metal carbonate, up to 4% by weight of alkali metal sulfate, 0.1% to 10% by weight of at least one substance selected from the group consisting of foam inhibitors, enzymes, redeposition inhibitors, optical brighteners, dyes and fillers, and 1 to 20% by weight of water, all weights being based on the weight of said composition.

11. A composition as in claim 1 having an apparent density of 700 g/l. to 1,200 g./l. and containing 5% to 15% by weight of anionic surfactant, 10% to 22% by weight of nonionic surfactant, 20% to 45% by weight of alkali metal alumosilicate, 5% to 20% by weight of said co-builder, up to 10% by weight of alkali metal silicate, 2 to 10% by weight of alkali metal carbonate, up to 4% by weight of alkali metal sulfate, 0.1% to 2.5% by weight of foam inhibitor, 0.5% to 5% by weight of dye transfer inhibitor, 0.1% to 3% by weight of at least one substance selected from the group consisting of fabric softeners, redeposition inhibitors, dyes and fragrances, and 5% to 20% by weight of water, all weights being based on the weight of said composition.

12. The process of reducing incrustation on laundry, comprising washing said laundry with a phosphate-free detergent composition comprising finely-divided, water-insoluble builder components and from 0.5% to 15% by weight, based on the weight of said composition, of an at least partly water-soluble co-builder, said co-builder comprising the oxidation products of polyglucosans wherein, on average, at least 15 mole percent thereof consists of oxidized anhydroglucose units corresponding to formula I

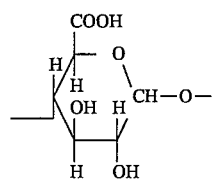

and which have an average molecular weight of up to 15,000.

13. A process as in claim 12 wherein said co-builder contains at least 25 mole percent of said oxidized anhydroglucose units.

14. A process as in claim 12 wherein the carboxyl groups of said co-builder are present at least partly as alkali metal salts.

15. A process as in claim 12 wherein said co-builder is derived from the group consisting of cellulose- and starch-based polyglucosans and which contains up to 95 mole percent of oxidized anhydroglucose units having an average molecular weight from 1,000 to 10,000.

16. A process as in claim 12 wherein said co-builder has been produced by selective oxidation of starch using NO₂ as the oxidizing agent.

17. A process as in claim 12 wherein said co-builder comprises selectively oxidized starch derivatives having average molecular weights from 1,500 to 3,000 produced by oxidation and hydrolysis of moisture-containing, finely-divided native starch in a fluidized bed in the presence of a gas phase consisting of NO₂ or N₂O₄.

18. A process as in claim 12 wherein said composition is substantially free from water-soluble organic complexing agents selected from the group consisting of polymeric carboxylates, substituted phosphonates, and salts of nitrilotriacetic acid.

19. A process as in claim 12 wherein said water-insoluble builder components are selected from the group consisting of zeolite compounds, crystalline layer silicates, and hydrotalcites.

20. A process as in claim 12 wherein said zeolite compounds and said co-builder are present in a weight ratio of at least 3:1.

21. A process as in claim 12 wherein said composition has an apparent density of 700 g/l. to 1,200 g./l. and contains 15% to 25% by weight of anionic surfactant, 1% to 15% by weight of nonionic surfactant, 15% to 40% by weight of alkali metal aluminosilicate, 2% to 15% by weight of said co-builder, 10% to 30% by weight of bleaching agent, 2% to 10% by weight of bleach activator, up to 10% by weight of alkali metal silicate, up to 15% by weight of alkali metal carbonate, up to 4% by weight of alkali metal sulfate, 0.1% to 10% by weight of at least one substance selected from the group consisting of foam inhibitors, enzymes, redeposition inhibitors, optical brighteners, dyes and fillers, and 1 to 20% by weight of water, all weights being based on the weight of said composition.

\* \* \* \* \*

UNITED STATES PATENT AND TRADEMARK OFFICE
CERTIFICATE OF CORRECTION

PATENT NO. : 5,501,814
DATED : Mar. 26, 1996
INVENTOR(S) : Engelskirchen et al.

It is certified that error appears in the above-indentified patent and that said Letters Patent is hereby corrected as shown below:

```
In Col 3, line 66, "Makromolekulate" should read --Makromolekulare--.
In Col 4, line 1, "Engelskitchen" should read --Engelskirchen--.
In Col 4, line 1, after --tives)"-- please delete [,].
In Col 4, line 4, after --entitled-- please delete [,].
In Col 4, line 5, after --Applications"-- please delete [,].
In Col 4, line 7, after --Cellulose"-- please delete [,].
In Col 4, line 8, after "cit.," please insert --pages 262 to 265--.
In Col 6, line 47, "surfacrants" should read --surfactants--.
In Col 7, line 37, "(NaBO_2.H_2O_2.3H_2)" should read --(NaBO_2.H_2O_2.3H_2O)--.
```

Signed and Sealed this

Third Day of March, 1998

*Attest:*

BRUCE LEHMAN

*Attesting Officer*     Commissioner of Patents and Trademarks